(12) United States Patent
Overton et al.

(10) Patent No.: US 9,483,279 B2
(45) Date of Patent: Nov. 1, 2016

(54) MECHANISM FOR PROVIDING UNIFIED ACCESS TO DECENTRALIZED USER ASSISTANCE REPOSITORIES

(75) Inventors: Mark Overton, Malvern, PA (US);
Taimur Mirza, Skippack, PA (US);
John Zaums, Chester Springs, PA (US)

(73) Assignee: Oracle International Corporation, Redwood Shores, CA (US)

( * ) Notice: Subject to any disclaimer, the term of this patent is extended or adjusted under 35 U.S.C. 154(b) by 1375 days.

(21) Appl. No.: 13/286,060

(22) Filed: Oct. 31, 2011

(65) Prior Publication Data

US 2013/0110923 A1 May 2, 2013

(51) Int. Cl.
| | |
|---|---|
| G06F 15/16 | (2006.01) |
| G09G 5/00 | (2006.01) |
| G06F 11/00 | (2006.01) |
| G06F 9/44 | (2006.01) |
| H04N 21/858 | (2011.01) |
| G06F 17/30 | (2006.01) |
| H04L 29/12 | (2006.01) |

(52) U.S. Cl.
CPC ....... *G06F 9/4446* (2013.01); *G06F 17/30864* (2013.01); *H04L 61/1511* (2013.01); *H04N 21/8586* (2013.01)

(58) Field of Classification Search
CPC ............. G06F 21/41; G06F 17/30126; G06F 9/4446; G06F 17/30864; H04L 63/08; H04L 63/083; H04L 67/2819; H04L 61/1511; H04N 21/8586
USPC ......................................................... 709/204
See application file for complete search history.

(56) References Cited

U.S. PATENT DOCUMENTS

| | | | | |
|---|---|---|---|---|
| 5,729,682 | A * | 3/1998 | Marquis et al. | 709/229 |
| 5,799,268 | A * | 8/1998 | Boguraev | 704/9 |
| 7,039,606 | B2 * | 5/2006 | Hoffman et al. | 705/80 |
| 7,054,837 | B2 * | 5/2006 | Hoffman et al. | 705/28 |
| 7,072,843 | B2 * | 7/2006 | Menninger et al. | 705/7.31 |
| 7,493,403 | B2 * | 2/2009 | Shull et al. | 709/229 |
| 7,734,557 | B2 * | 6/2010 | Meehan et al. | 706/46 |
| 7,761,583 | B2 * | 7/2010 | Shull et al. | 709/229 |
| 7,805,733 | B2 * | 9/2010 | McKinley | 719/320 |
| 8,132,017 | B1 * | 3/2012 | Lewis | 713/183 |
| 8,140,676 | B2 * | 3/2012 | Davies et al. | 709/225 |
| 8,250,185 | B2 * | 8/2012 | Bauer et al. | 709/220 |
| 8,346,626 | B2 * | 1/2013 | Robertson | 705/26.8 |
| 8,402,147 | B2 * | 3/2013 | Bondy | 709/228 |
| 8,477,775 | B2 * | 7/2013 | Choudhary et al. | 370/389 |
| 2004/0010483 | A1 * | 1/2004 | Brands | G06F 17/30734 706/45 |
| 2004/0201604 | A1 * | 10/2004 | Kraenzel et al. | 345/700 |
| 2006/0184540 | A1 * | 8/2006 | Kung et al. | 707/10 |
| 2006/0259861 | A1 * | 11/2006 | Watson | G06F 9/4446 715/705 |
| 2007/0157158 | A1 * | 7/2007 | McKinley | 717/101 |
| 2007/0271230 | A1 * | 11/2007 | Hart | G06F 17/30876 |

(Continued)

*Primary Examiner* — Arvin Eskandarnia
*Assistant Examiner* — Margishi Desai
(74) *Attorney, Agent, or Firm* — Kilpatrick Townsend and Stockton LLP

(57) ABSTRACT

Aspects of the present invention include a method of deploying user assistance information. The method includes providing access to a container storing a plurality of context domain declarations (CDDs), creating a new CDD, wherein the new CDD specifies an associated user assistance repository (UAR), creating pattern information which identifies an application or application state for which the associated UAR is applicable, deploying the new CDD independently from the application and the associated UAR, and distributing the new CDD to one or more users.

18 Claims, 11 Drawing Sheets

(56) References Cited

U.S. PATENT DOCUMENTS

| | | | |
|---|---|---|---|
| 2008/0034211 A1* | 2/2008 | Shull et al. ................... | 713/175 |
| 2008/0235280 A1* | 9/2008 | Schoen et al. ............. | 707/104.1 |
| 2008/0256082 A1* | 10/2008 | Davies et al. ................... | 707/10 |
| 2008/0256250 A1* | 10/2008 | Wakefield ................... | 709/229 |
| 2008/0301562 A1* | 12/2008 | Berger ............... | G06F 17/3089 |
| | | | 715/733 |
| 2009/0019516 A1* | 1/2009 | Hammoutene et al. .......... | 726/1 |
| 2009/0099882 A1* | 4/2009 | Karabulut ......................... | 705/7 |
| 2009/0119402 A1* | 5/2009 | Shull et al. ................... | 709/224 |
| 2009/0216683 A1* | 8/2009 | Gutierrez ........................ | 705/80 |
| 2009/0270099 A1* | 10/2009 | Gallagher et al. ......... | 455/435.1 |
| 2009/0281982 A1* | 11/2009 | Nigul et al. ........................ | 707/1 |
| 2009/0287664 A1* | 11/2009 | Angelo ............. | G06F 17/30864 |
| 2009/0287837 A1* | 11/2009 | Felsher ......................... | 709/229 |
| 2010/0088686 A1* | 4/2010 | Langworthy et al. ........ | 717/143 |
| 2010/0199188 A1* | 8/2010 | Abu-Hakima et al. ....... | 715/733 |
| 2010/0199257 A1* | 8/2010 | Biggerstaff ................... | 717/104 |
| 2010/0211596 A1* | 8/2010 | Tang .................. | G06F 17/3089 |
| | | | 707/769 |
| 2010/0268702 A1* | 10/2010 | Wissner ............ | G06F 17/30705 |
| | | | 707/711 |
| 2010/0274836 A1* | 10/2010 | Orentas ............ | G06F 17/30864 |
| | | | 709/203 |
| 2010/0281125 A1* | 11/2010 | Virtanen ................... | B07C 3/00 |
| | | | 709/206 |
| 2010/0290398 A1* | 11/2010 | Choudhary et al. .......... | 370/328 |
| 2011/0099203 A1* | 4/2011 | Fastring ........... | G06F 17/30256 |
| | | | 707/783 |
| 2011/0153759 A1* | 6/2011 | Rathod ........................ | 709/206 |
| 2011/0167089 A1* | 7/2011 | Schoen et al. ................ | 707/802 |
| 2012/0150843 A1* | 6/2012 | Robert et al. ................. | 707/722 |
| 2012/0185821 A1* | 7/2012 | Yaseen et al. ................ | 717/105 |
| 2012/0324094 A1* | 12/2012 | Wyatt ................. | H04W 4/003 |
| | | | 709/224 |
| 2013/0036301 A1* | 2/2013 | Pelton et al. ................. | 713/155 |

\* cited by examiner

```
<UserAssistanceRepository>
    <Location href="http://www.somewhere.com/sampleuar />
        <ContextDomain>
            <LogicalOperator Value="or">
                <Match type="UriPattern" value="http://www.somesite.com/someapplication/* />
                <Match type="UriPattern" value="http://www.someforum.com/someappforum/* />
            </LogicalOperator>
        </ContextDomain>
</UserAssistanceRepository>
```

MECHANISM FOR PROVIDING UNIFIED ACCESS TO DECENTRALIZED USER ASSISTANCE REPOSITORIES

BACKGROUND

One problem with current implementations is the inability to create a single unified end-user access point which can effectively consolidate multiple decentralized sources of user assistance information (i.e., User Assistance Repository (UAR)) for any and all applications a user may encounter. There is no known existing solution to the problem. Current sources are usually tied to a particular application via a link from the application or they are centralized to cover multiple applications.

However, there are several shortcomings of linking each application to a UAR via the application interface. First, it does not provide a single access point for the user which works across all applications. Each application has its own access point with its own user interface conventions. Users often struggle to navigate application menus, and such an issue is one of the many problems that UARs are meant to alleviate. Accordingly, the problem is made worse as the number of applications that the modern user population needs to navigate increases. Thus, requiring the user to learn all of these user interfaces in order to get help in the first place is counterproductive.

In addition, the traditional systems of launching help from the application do not effectively incorporate the inclusion of third-party UARs. Usually, the application is built with a particular UAR in mind or at least needs to be configured to link to the UAR. Unless the application owner or administrator specifically does something to enable inclusion of such third-party UARs, it cannot occur. Furthermore, this is often problematic for many reasons; for example, the source of the UAR may not be the owner/administrator of the underlying application or the cost of modifying the application may be prohibitive or not possible (i.e., not having access to proprietary code, APIs, etc.). An effective solution would allow easy access to the UAR without requiring the cooperation of the owner/administrator of the application. Furthermore, there are existing systems which consolidate user assistance material across multiple applications. This is usually done by consolidating the information in a single repository or a cooperating group that can be searched as a whole. This method does not work when there are multiple sources of user assistance being supplied by independent sources.

Various methods can be used to gather an application context from the user state, search one or more repositories, and then return results to the user. An external client side component is sometimes used to launch the user assistance without the need to modify the underlying application. Nonetheless, the shortcoming of these systems is that they do not effectively handle large numbers of completely independent UARs with heterogeneous user populations and varying application usages.

Furthermore, without a way to filter out UARs which are irrelevant to the current user state, all of the repositories would need to be searched to determine whether they have matching content for the user's current situation. Such searching is not only inefficient and time-consuming but often problematic. The UARs often have associated authentication control and the user would need to be authenticated for each UAR in order to search it (whether or not it is relevant). The user would be presented with multiple login dialogs if the authentication had not been already cached.

Additionally, the searches of the repositories are often designed to return results on a sliding scale by best match. In cases where there are no high-quality matches, the searches will return poor matches. These poorly-matching search results are not only distracting to the user, but they can also be inappropriate and result in help for the wrong application being offered to the user. Hence, for these and other reasons, improvements are needed in the art.

BRIEF DESCRIPTION OF THE DRAWINGS

A further understanding of the nature and advantages of the present invention may be realized by reference to the remaining portions of the specification and the drawings wherein like reference numerals are used throughout the several drawings to refer to similar components. In some instances, a sub-label is associated with a reference numeral to denote one of multiple similar components. When reference is made to a reference numeral without specification to an existing sub-label, it is intended to refer to all such multiple similar components.

FIG. 9 illustrates one example of a CDD, according to embodiments of the present invention.

SUMMARY OF THE INVENTION

Figure 1:
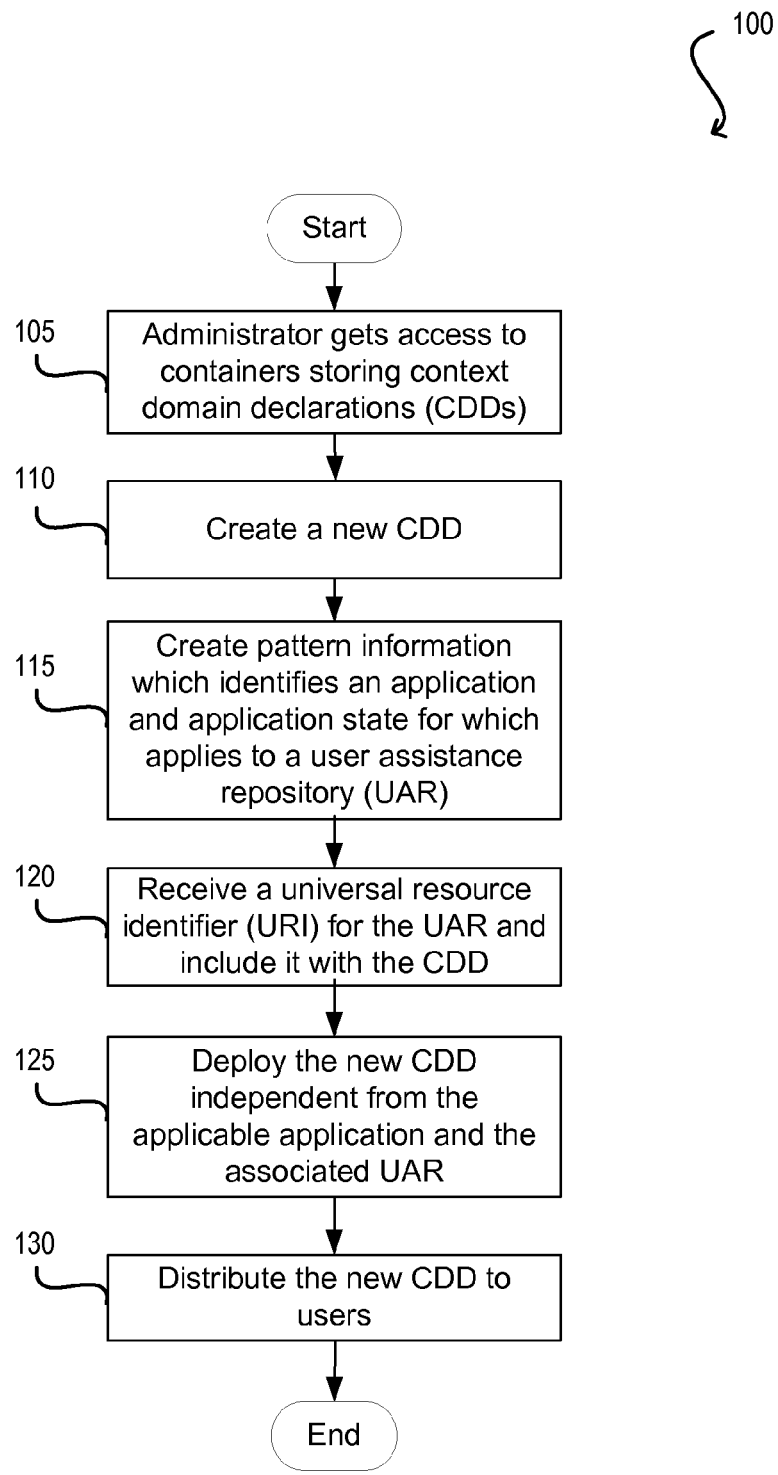
FIG. 1 illustrates a method of accessing context domain declarations (CDDs), according to embodiments of the present invention.

Embodiments of the present invention include a method of deploying user assistance information. The method includes providing access to a container storing a plurality of context domain declarations (CDDs), creating a new CDD, wherein the new CDD specifies an associated user assistance repository (UAR), creating pattern information which identifies an application or application state for which the associated UAR is applicable, deploying the new CDD independently from the application and the associated UAR, and distributing the new CDD to one or more users.

The method further includes retrieving a universal resource identifier (URI) for the UAR, and using the URI to access content from the UAR. The distributing of the new CDD to the one or more users further comprises notifying the one or more users via one or more communications protocols. The one or more communications protocols include one or more of the following: email, resource description framework (RDF) site summary (RSS), short message service (SMS), micro-blogging, or blogging.

The method further includes automatically populating one or more of the communications protocols for the one or more users based at least in part on a business or application group associated with the one or more users, determining that the UAR associated with the new CDD is to be accessed by at least one user, caching content from the new CDD, and merging entries from the new CDD with previously existing entries.

Furthermore, the method includes determining that the UAR associated with the new CDD is not to be accessed by at least one user, determining that the new CDD includes a push deployment designation, and in response to the determination that the new CDD includes the push deployment designation, caching content from the new CDD.

The pattern information comprises structured data configured to be processed by machines: extensible markup language (XML) or JavaScript Object Notation (JSON). The associated UAR is controlled by a third party, and wherein at least one of the third party, the one or more users, and an application's host server are independently controlled and authenticated. The method further includes that adding of the new content into a UAR is initiated in part by interacting with a submit new content interface mechanism, and the accessing the associated UAR includes pre-populating security credential information.

In a further embodiment, a method of providing universal access to user assistance repositories (UARs), is described. The method includes providing a unified UAR access point to at least one user, identifying current state information for an application being executed for the at least one user, wherein the current state information includes state identification information, and accessing context domain declarations (CDDs) from the original repository or from a cached storage location. The CDDs are associated with one or more UARs associated with the unified UAR access point. The method further includes extracting pattern information for each of the CDDs, comparing the pattern information for each of the CDDs with the state identification information, determining that at least one of the CDDs is applicable to the current state of the application, and in response to determining that at least one of the CDDs is applicable to the current state of the application, retrieving universal resource information (URI) for the one or more associated UARs.

The method further includes determining that none of the UARs include applicable information for the current state identification information, in response, providing an interface configured to add one or more new documents to one or more UARs where the UAR association is determined based on the CDDs and the application state, and searching each of the retrieved URIs and returning a subset of the associated UAR. The subset of the associated UAR includes content specific to the current state of the application. The method further comprises populating a set of attributes for the one or more UARs, and providing the at least one user with a subscription interface for the one or more UARs based on the set of attributes. The method further includes generating a set of rules for each UAR indicating each UAR's relevancy to one or more contexts, and updating the set of rules in response to receiving changes to the relevancy of at least one of the UARs.

In yet another embodiment, a computer-readable medium for updating user assistance content, having sets of instructions stored thereon, is described. The instructions further includes receive a first indication that an application is being executed by a user. The user is associated with a general group and a sub-group of the general group. The instruction further provide for retrieving current state information about the application, receiving a second indication that at least a portion of user assistance information is unavailable for the application at the current state of the application, comparing one or more context domain declarations (CDDs) with the current state information of the application, wherein each of the CDDs is associated with one or more user assistance repositories (UARs), for each of the CDDs which match the current state of the application, querying the associated one or more UARs, receiving results of the query to the user for selection, wherein each of the results is associated with the general group, in response to a request, receiving at least one result associated with the sub-group, receiving the request to submit the at least one result associated with the sub-group, matching the at least one result with a plurality of UARs, receiving a selection of at least one of the plurality of UARs, and uploading the at least one search result associated with the sub-group to the selected at least one of the plurality of UARs.

The computer-readable medium further includes that at least one result associated with the general group is stored in a central UAR, and the sub-group is included in a department specific UAR.

DETAILED DESCRIPTION OF THE INVENTION

While various aspects of embodiments of the invention have been summarized above, the following detailed description illustrates exemplary embodiments in further detail to enable one of skill in the art to practice the invention. In the following description, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form. Several embodiments of the invention are described below and, while various features are ascribed to different embodiments, it should be appreciated that the features described with respect to one embodiment may be incorporated with another embodiment as well. By the same token, however, no single feature or features of any described embodiment should be considered essential to the invention, as other embodiments of the invention may omit such features.

Aspects of the present invention relate to solutions which work effectively with dynamically changing sets of UARs which are being made available to users. There may be multiple UARs applicable to the same application, or each UAR may have information about multiple applications, and this information may cross application boundaries. Additional needs of an effective solution include the ability to interact with UARs which may or may not be administered centrally, with UARs that may be provided by completely independent entities, where each user may have access to different sets of UARs based upon various criteria, such as: authorization by the source, whether they use applications covered by the source, interest in or applicability of the UARs to the user, membership in groups, etc. Furthermore, there may be underlying applications that do not need to be configured or modified to specify which UARs apply to the applications.

Additionally, there is high value in quickly narrowing down which sources are relevant to the user's current situation both for system efficiency and to provide the user with the most appropriate information without it being overwhelmed and inundated with a significant amount of non-relevant information. As such, aspects of the present invention are designed to allow repositories to come and go dynamically without requiring central administration.

Furthermore, the following are additional aspects of the present invention. In one embodiment, there may be a definition of a context domain declaration (CDD) which specifies the existence and location of a UAR and when the UAR is relevant to the user's current state. Additionally, there may be the ability to separate a CDD from the UAR itself to allow access to the CDD without requiring access to the UAR itself. Additionally, the invention allows the individualized consumption of such CDDs by end users. Each user can subscribe to the set of CDDs that match their individual application usage. In a further embodiment, the UARs can declare what contexts the UAR applies to (e.g., "context domain") by supplying a CDD, and such contexts can be separated from the UAR itself. Thus, at the time that a user requests assistance, these CDDs can be analyzed along with the current state of the user in order to narrow down and prioritize which UARs are relevant prior to access or searching of the UAR by the user.

In one embodiment of the present invention, a software component on, for example, a client machine is configured to compare the current state of the client (i.e., what application the client is using, the current URL, if applicable, the particular part of the application being used, the user's preferred language, process the client is in the midst of, the type of device the client is using, and other contextual indicators which can be quantified by the system) with the context domain declarations for the UARs that are known to the client machine at the time of the request.

Hence, the UARs which declarations match the current state of the client are then searched. Additionally, the order of the searches can be influenced by, for example, how specific the declarations were and/or by user preferences. Such context domain declarations can be discovered over time and cached, or the context domain declaration's location(s) can be cached for retrieval, as needed.

Furthermore, there are various ways in which such discovery can occur. For example, an email with the URL to the declaration can be sent to users, and then the users would follow the link and the client side component would be made aware of the context domain and register the domain declaration. Alternatively, the declarations may be published on any web site that is made available to the user in a variety of distribution methods (e.g., this might include corporate intranets, online for purchase content, freely available web sites, etc.). The UAR itself may also be marked in such a way to indicate there is a CDD and where it is located. In this way, a user who navigates to the UAR through some other means can be notified that it can be registered for future use via the CDD registry.

A further discovery method may be that an application is marked in a way that points to the repository context domain declaration and indirectly to appropriate UARs. For example, the client side component can look for these domain declarations and remember them for later use. Furthermore, such declarations might be pushed out to the client using standard systems management software, or the like. However discovery of domain declarations occurs, once the context domain declaration is registered, the associated UAR is available to the user and will be searched if it is applicable to the current user state.

As discussed above, the context domain declarations can specify what application domain each repository as a whole applies to. For web applications, this might be a URI pattern, a rule that matches certain elements of the page source, or combinations of these and other machine readable state information. Thick client application rules might include the executable name of the application, window class information of the application, the current document name, the current window name, etc. There may also be rules that indicate what language the user prefers and other criteria for selecting the appropriate repository for the current context of the user. These rules do not need to be granular enough to specify the specific content in the repository that is relevant, but instead may be designed to not require potentially sensitive information such as transaction names, process descriptions, or the full text of web pages. Such information may be left inside the UAR and only accessed after a preliminary determination has been made that the information contained within the UAR is worth searching.

Furthermore, when a CDD is discovered, it may be cached for future reference. The CDD may be cached locally on the client machine or at a server side database which stores the subscriptions on an individualized basis. The advantage of storing the CDD subscriptions on a server is that they would be uniform and accessible from any device from which the user accesses the applications. This subscription server could also allow central administration and backup. For example, an organization that controls the CDD subscription server could remove an obsolete subscription from all users which use that server or add a subscription to all users based on group membership, or the like. In some circumstances, this would be more efficient than a one-by-one discovery of the CDDs.

During discovery of a CDD, the user may be prompted to accept the subscription, and whether the user is prompted may depend on the credentials of the source of the CDD, preferences of the user, policies put in place by the organization which controls the user's client machine, etc. Regardless of whether the user is interactively involved in the acceptance of the CDD subscription, the system may allow each user to have an individualized set of subscriptions to match with their particular application usage.

Another use of the mapping of the user context to the applicable UARs is to better enable content creation by the end user. The same CDD information can be used to determine to which UAR the user should have new content submitted. The previous discussion described a system in which the appropriate UAR is selected to be searched based on the current state of the user. If a user desires to create new content in the environment described above (with multiple decentralized sources of user assistance information), then one consideration is how to determine to which UAR to submit such new content. In one embodiment, to be effective for a general user population, this should be as automated and as seamless a process as possible. By leveraging the mapping provided by the CDDs, the user can be presented with the most appropriate location to store his new content. Additionally, by using the same mapping for retrieval and storage, the user may need only understand one concept.

Additionally, the present invention allows for context information to be separated from the source and declared in such a way that is limited specifically to defining whether the UAR as a whole applies to the user's current state. Accordingly, doing this enables the removal of sensitive information from the CDD so that it can be hosted in a less restrictive authentication context, thereby avoiding the need to authenticate against irrelevant indexes which may be tightly controlled because they contain sensitive or proprietary information. This also enables material reduction in size to increase speed and caching efficiency (as compared to the entire set of context information), as well as reduction in how often the information changes to reduce cache updates. Also, unnecessary searches and inappropriate and low quality results are eliminated.

Further embodiments of the invention include a workflow which includes one or more applications that are deployed on one or more servers managed by one or more cooperating or non-cooperating administrators, and one or more UARs for the applications which are created by one or more cooperating or non-cooperating organizations. Further, one or more UARs are deployed on one or more servers managed by cooperating or non-cooperating organizations, and a unified access point that consumes and processes the CDD is installed or available to the users for access.

The workflow further includes the creation of CDDs made up of: deployment which is definition of a CDD and availability of the CDD, discovery which allows end users to gain access to the CDD, and consumption in which the CDDs are used in the process of constructing UAR content to be made available to the users.

In one embodiment, deployment occurs in response to one or more administrators establishing an application to access UARs/CDDs. In one embodiment, the administrator accesses the container storing the CDD(s) (e.g, an XML file or the like), a new CDD is created, the administrator enters a pattern that identifies the application applied to the UAR, and the administrator enters the URI for the UAR. These CDDs may be stored individually or grouped for access as a set. Grouping multiple CDDs as a set does not preclude the user from consuming other CDDs from other locations. Further, the CDD is distributed to end users through any number of means including: web servers, email, file server, push client configuration, etc. In one embodiment, the CDD itself is separate from both the application and the UAR, and the CDD typically does not (but may in some circumstances) require authentication through the application or UAR authentication systems. In a further embodiment, multiple, non-cooperating administrators may create a CDD for the same or a different application, and when two administrators create a CDD for the same application, this may permit a user to have access to multiple UARs for the same application.

In one embodiment, discovery occurs when a user is provided with a new CDD through manual and/or automated means. The new CDDs may be made available to the user from multiple administrators over time. Particularly, self-discovery involves a user discovering a CDD through various methods, such as receiving an email including a link to the CDD, navigating a web browser to a location including the CDD, or navigating to an application that embeds the CDD location (e.g., in an HTTP header). The client side component which processes CDD information may look for such information embedded in the applications a user traverses and prompts the user about its existence. Then, the user determines if the UAR described by the CDD is currently of interest to them or will ever be of interest in the future. In one embodiment, different users may consume different CDDs based on the availability of the CDDs and the relative interest of the UAR as described by the CDD. Once a user selects a UAR described by the CDD, the contents of the CDD are cached in a storage location for later consumption by the user through the unified access point, and new entries may be merged with existing entries.

Alternatively, in an administrative push deployment, an administrator creates a push that includes one or more CDDs, and the contents of the CDDs are cached in a user-specific location for later consumption at the unified access point. In one embodiment, the new entries may overwrite or be merged with existing entries. Furthermore, both self-discovery and administrative push deployments of CDDs may co-exist.

In a further embodiment, consumption of content occurs when a user accesses the unified access point interface when assistance is needed (e.g., clicking a button or the like). The unified access point reads data from the user's current state in the software application. In one embodiment, for browser-based applications, this may be the application's URI, elements from the DOM of the page, etc. Alternatively, for desktop applications, this may be the executable name of the application or, in the case of Microsoft Windows applications, the window class names, captions, etc. The unified access point then iterates through all CDD entries (application pattern and UAR URIs) read from the user specific location at which CDDs are cached, the unified access point compares data read from the application in the application patterns defined in the CDDs, and then for those application patterns that match, the unified access point retrieves the UAR URI for each matching pattern. As such, multiple matches will result in multiple UAR URIs being returned. Then, the unified access point may then perform a search of each UAR to return specific content to the user.

Turning now to FIG. 1, a method 100 of accessing context domain declarations (CDDs) is illustrated, according to embodiments of the present invention. At process block 105, access to containers storing CDDs is provided, and creation of new CDDs occurs (process block 110). At process block 115, pattern information which identifies an application and application state to which the CDD applies to a UAR may be created.

Further, at process block 120, a universal resource identifier (URI) or similar identifier for the UAR may be received and included with the new CDD. Then, the new CDD may be deployed independent from the applicable application and the associated UAR (process block 125). Thus, at process block 130, the new CDD may be distributed to users for future use. Accordingly, the relevant UARs are determined, per the current context of the user's application.

Figure 2:
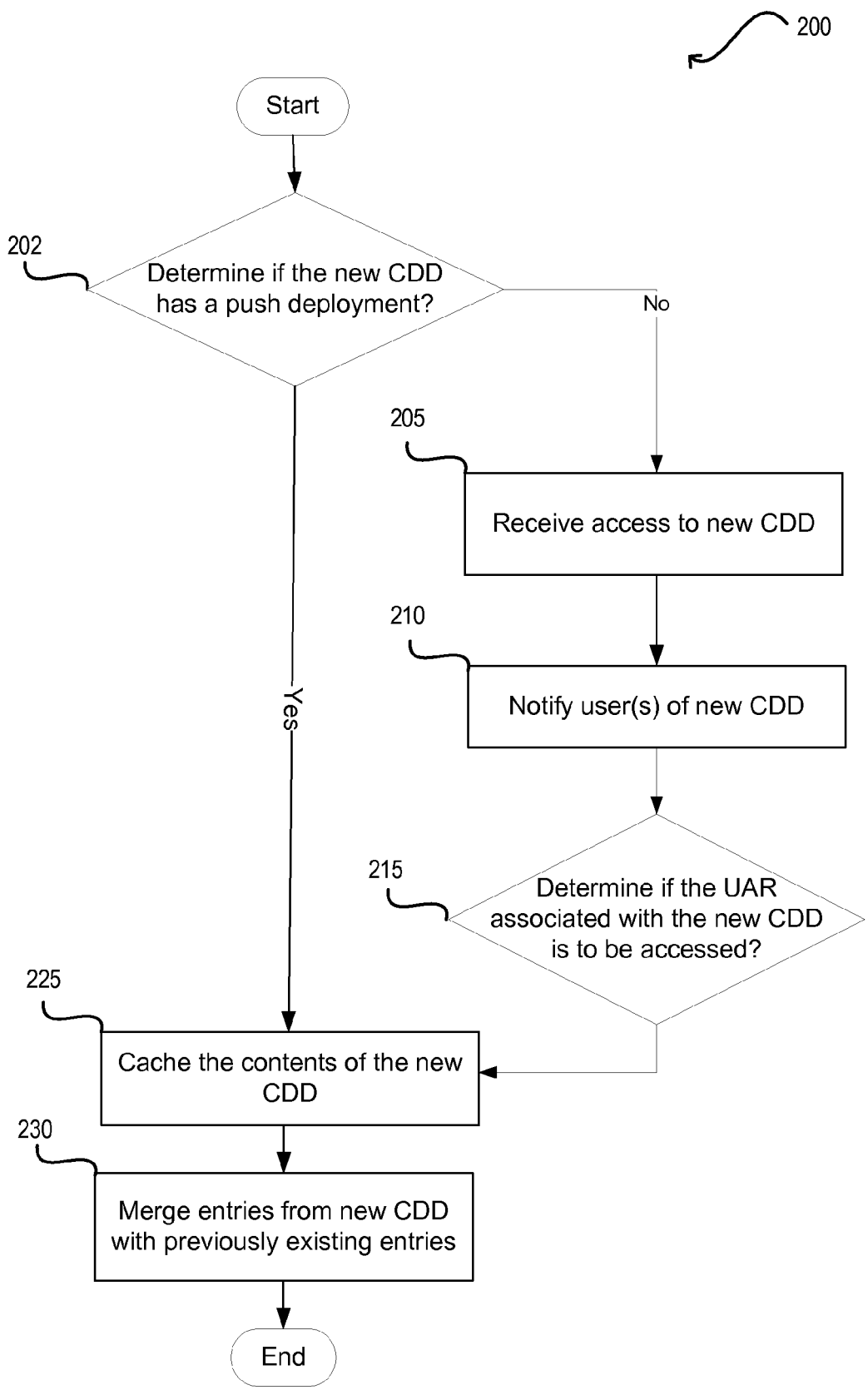
FIG. 2 illustrates a method of providing notification for CDDs, according to embodiments of the present invention.

Referring now to FIG. 2, a method 200 of providing notification for CDDs is illustrated, according to embodiments of the present invention. At process block 202 a determination is made whether a CDD will have a push deployment or use an ad-hoc discovery deployment. If a push deployment is associated with the CDD then the flow continues at block 225 and the CDD is cached without user intervention. Alternatively, if there is no push deployment then at process block 205, access to a new CDD is granted to one or more users. As such, the one or more users are notified of the access provided to the new CDD (process block 210). At decision block 215, a determination is made whether the UAR associated with the new CDD will be accessed by one of the users. If it is determined that the user is to access the new CDD, then the contents of the new CDD is cached for that user (process block 225). Then, at process block 230, entries from the new CDD may be merged with previously existing entries.

Figure 3:
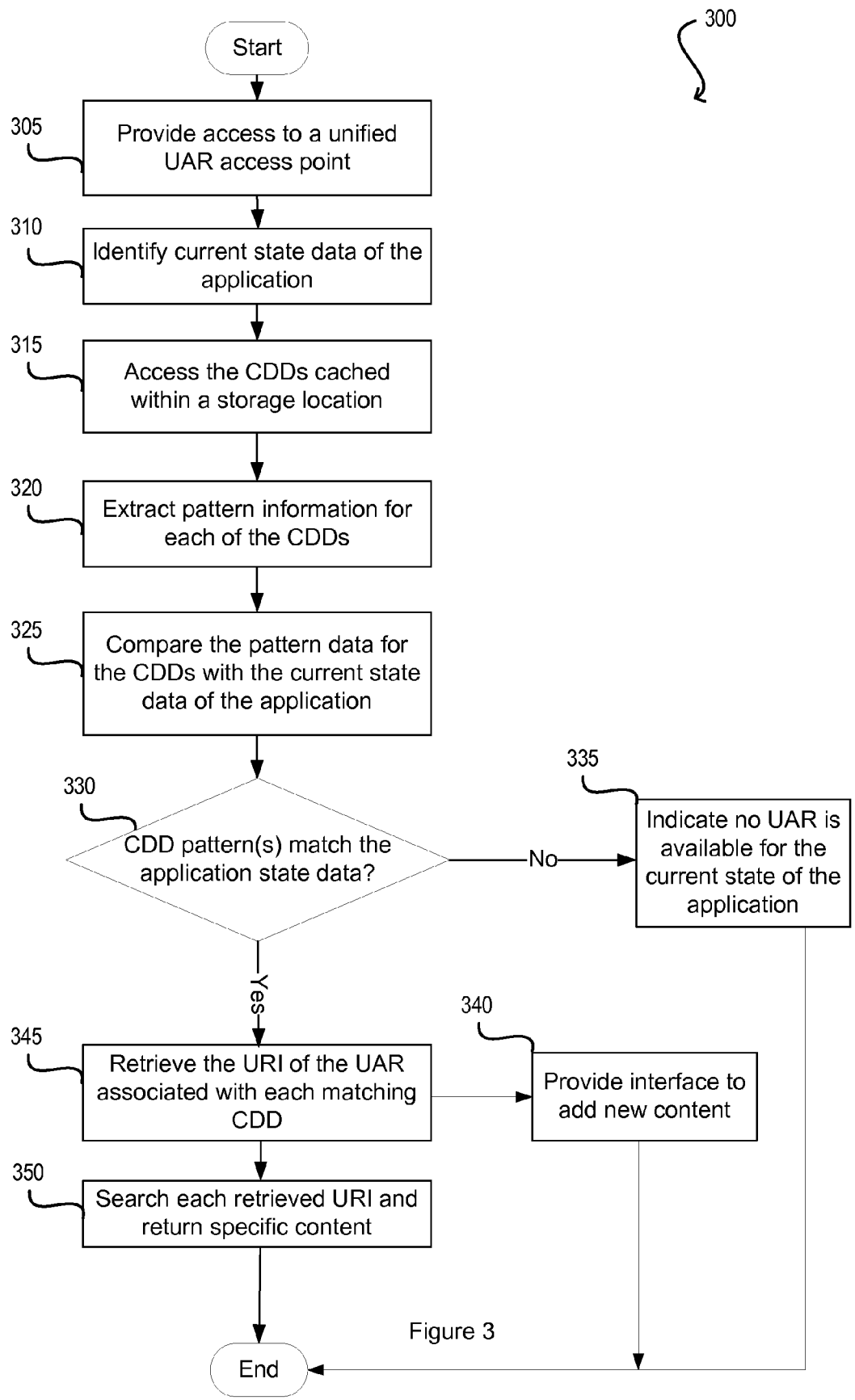
FIG. 3 illustrates a method of accessing UARs from a universal UAR access point, according to embodiments of the present invention.

FIG. 3 illustrates a method 300 of accessing UARs from a universal UAR access point, according to embodiments of the present invention. At process block 305, access to a unified UAR access point is provided. At process block 310, the current state of an application being run by a user is identified. At process block 315, CDDs cached within a storage location are accessed.

At process block 320, pattern information for each of the accessed CDDs is extracted. Then, the pattern data for each of the CDDs is compared to the current state data for the application (process block 325). At decision block 330, a determination is made whether the CDD pattern(s) match the current application state data. If there is a match with the pattern data of at least one of the CDDs, then at process block 345 the URI of the UAR associated with each matching CDD is retrieved. Additionally, in the case where there are matching UAR's, a parallel flow may optionally begin at process block 340 to allow user contribution to the associated UARs.

Accordingly, a search of each retrieved URI is conducted and specific content applicable to the current state of the application is returned (process block 350). Alternatively, if there are no matching CDD patterns with the current data of the application, then there is an indication that no results are returned for the current state data of the application (process block 335). Then, at process block 340, an interface for adding new content may be provided.

Figure 4:
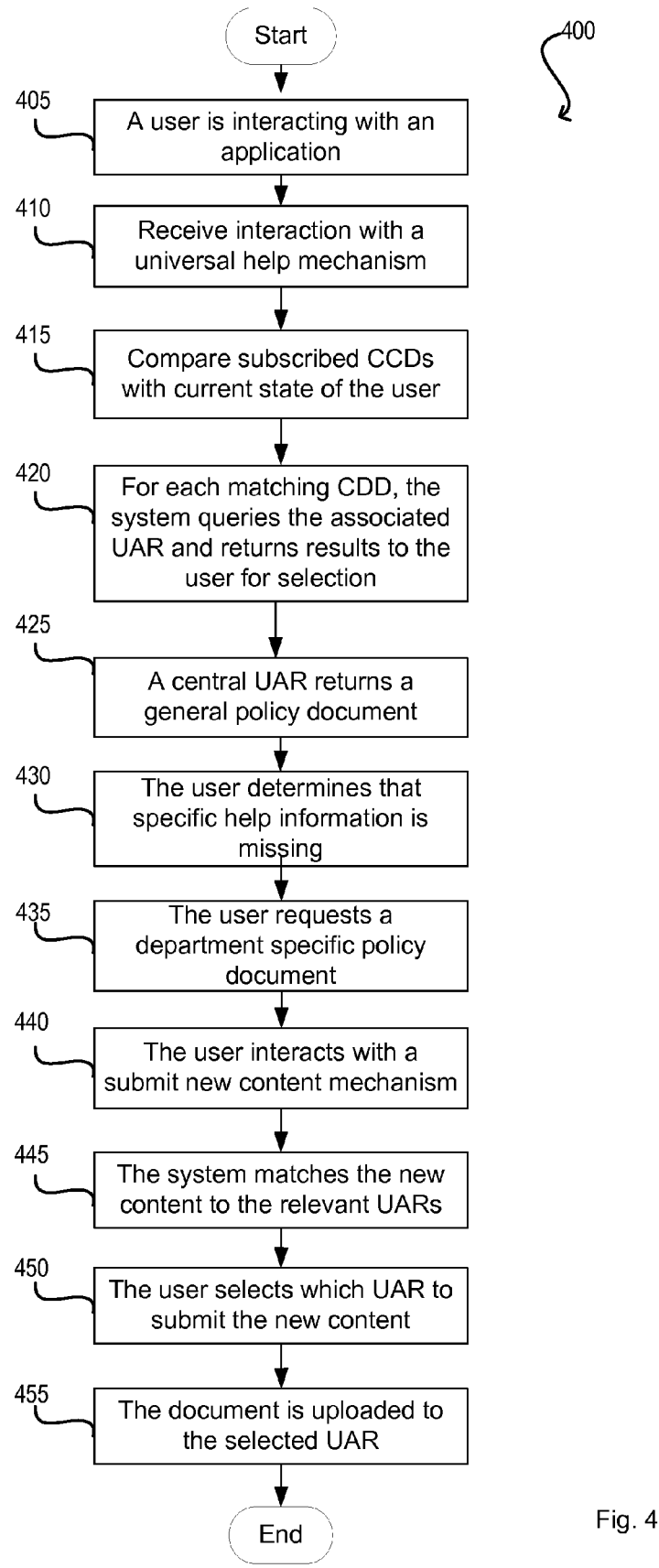
FIG. 4 illustrates a method of a user adding new content to a CDD, according to one embodiment of the present invention.

Referring next to FIG. 4, a method 400 of a user adding new content to a CDD is illustrated. At process block 405, a user is interacting with an application. For example, the user is using an expense report application, wherein the user logs into the corporate intranet and navigates to, for example, a web-based expense reporting system and creates a new expense report and begins entering expense lines.

Then, at process block 410, the user interacts with a universal help mechanism in the UI (e.g., a help button or the like) which has been installed on, for example, the user's browser toolbar. At process block 415, the system iterates a list of subscribed CDDs which the user has subscribed to and compares the current user state to each of the CDDs. Then, for each matching CDD, the system queries the associated UAR and returns results to the user for selection (process block 420). In this situation, the user may be, for example, subscribed to several dozen UARs; however, only two match the user's current state, one of which has been provided by a central application team for the expense application, and one that is provided by the user's own department.

Accordingly, at process block 425, a central UAR returns a document regarding mileage, and the user selects the result and reads the document. The documents may describe to the user the general procedures for entering mileage but state that individual department policies may affect what mileage can be expensed. In this example, no policy document was returned from the department UAR. At process block 430, the user determines that they are unaware of how to perform one or more functions within the application. For example, while entering one of the expenses, the user realizes that they do not know the proper method for entering mileage. At process block 435, the user contacts the group manager and is informed that there is a department policy document, and the user receives the document. As such, at process block 440, in order to make this document available to all department users while they are using the expense system, the user selects, for example, the "submit new content" function of the universal help system.

In one embodiment, at process block 445, the system may use the same CDD matching routine to find the same two relevant UARs and request from the user to indicate to which of the two UARs the user would like to submit their content (i.e., the central corporate repository or the department repository) (process block 450). Then, at process block 455, the user selects either the central corporate repository or the department repository to submit the document to (by uploading the document itself, by submitting a link to the document if it resides in a commonly accessible place, etc.). In this example, the user may submit to the department repository, and then any user from the user's department will see this document in their search results from the expense system.

Figure 5:
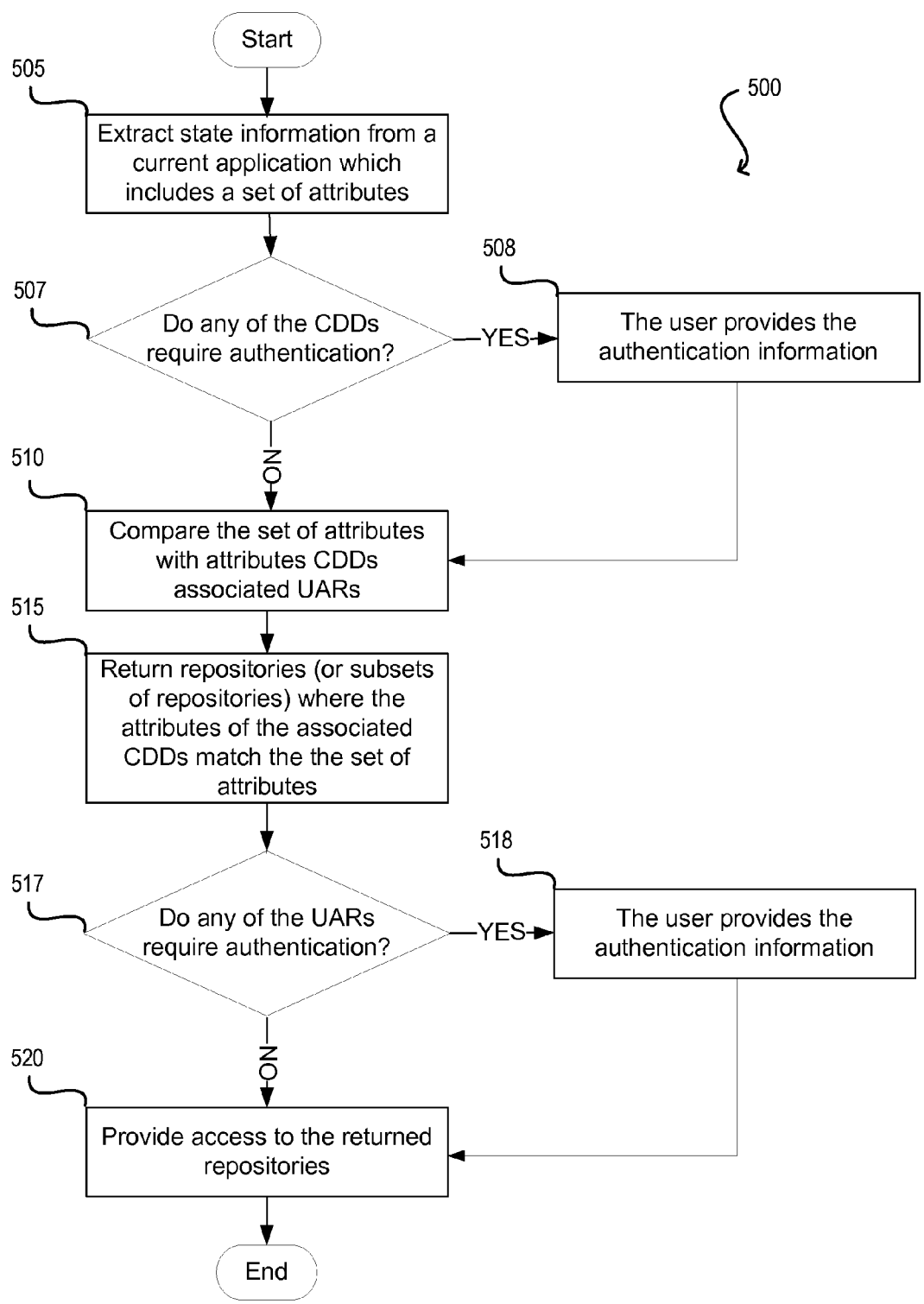
FIG. 5 illustrates a method of providing access to UARs, according to embodiments of the present invention.

Turning next to FIG. 5, a method 500 of providing access to UARs is illustrated, according to embodiments of the present invention. At process block 505, state information is extracted from a current application, and the current application includes a set of attributes. Decision block 507 considers the scenario where user authentication is needed to access the CDD information. If user authentication is need, then at process block 508, the user provides the authentication information. Alternatively, if authentication is not needed, then at process block 510, the set of attributes may be compared to attributes of CDDs associated with UARs.

At process block 515, repositories (e.g., UARs) or subsets of repositories where the attributes of the associated CDDs match the set of attributes are returned. Process block 517 considers the scenario where user authentication is necessary to access the UARs. If user authentication is need, then at process block 518, the user provides the authentication information. Alternatively, if authentication is not needed, then, at process block 520, access to the returned repositories is provided to the appropriate users.

Figure 6:
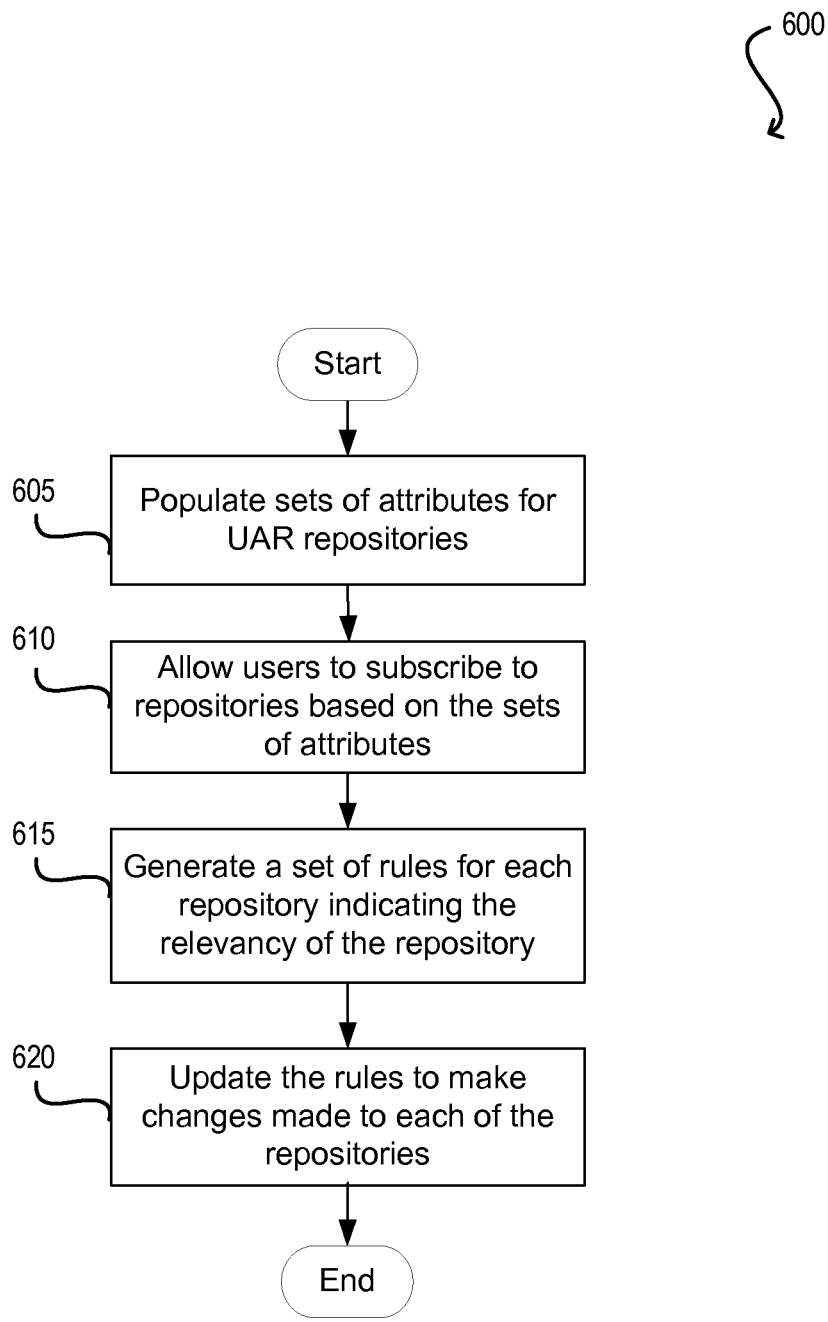
FIG. 6 illustrates a method of designating attributes for UARs, according to embodiments of the present invention.

Turning now to FIG. 6, a method 600 of designating attributes for UARs is illustrated, according to embodiments of the present invention. At process block 605, a set of attributes for a number of UAR repositories is populated. At process block 610, users are allowed to subscribe to repositories based on the sets of attributes. The sets of attributes for each repository are generated to indicate the relevancy of the repository to certain states of applications (process block 615). Then, at process block 620, the rules may be updated in order to reflect changes made to the content of each of the repositories.

Figure 7:
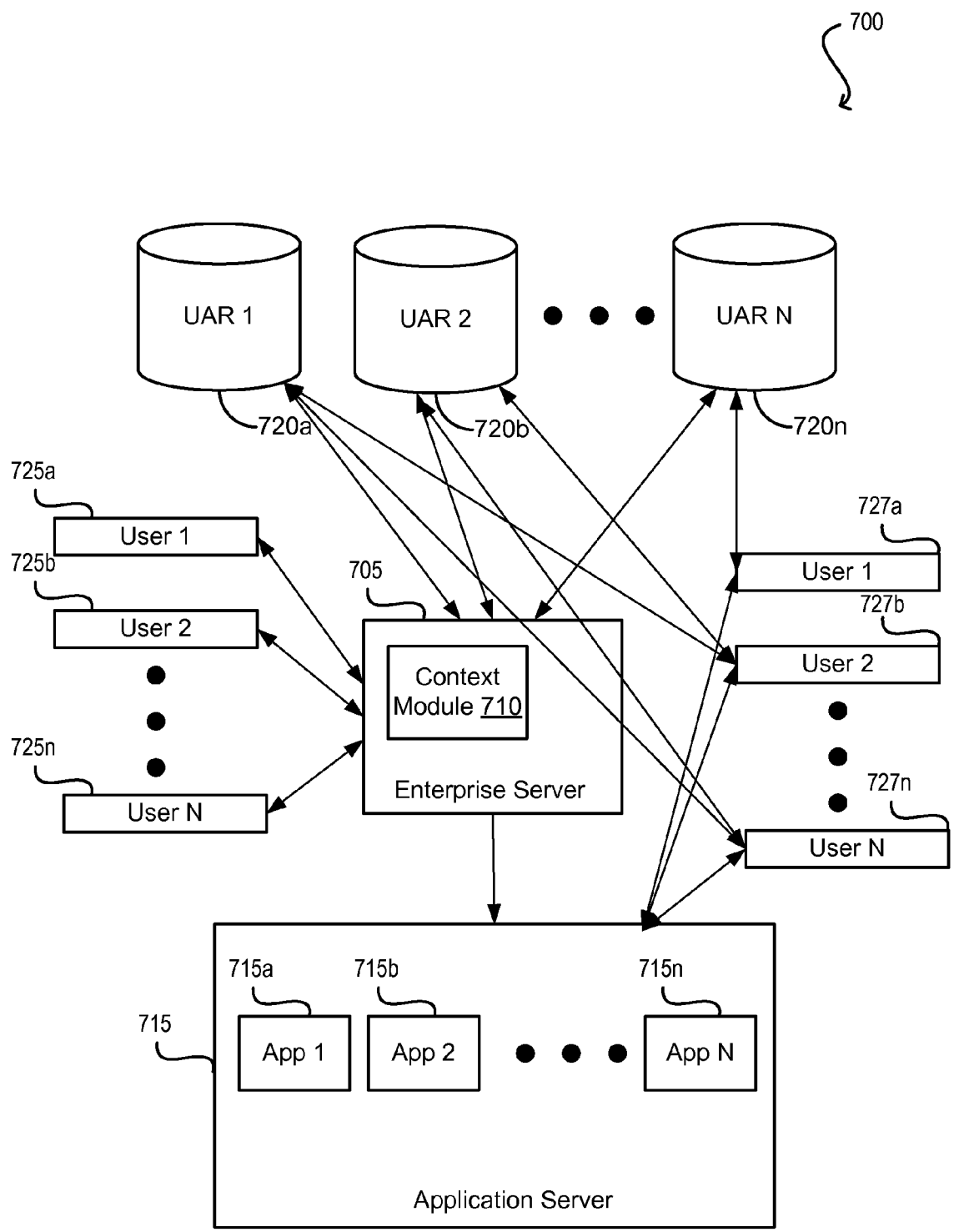
FIG. 7 illustrates a system for accessing UARs through a universal UAR access point, according to embodiments of the present invention.

FIG. 7 illustrates a system 700 for accessing UARs through a universal UAR access point, according to embodiments of the present invention. In one embodiment, the system includes an enterprise server 705 which includes a context module 710. The enterprise server 705 may be in communication with an application server 715, which may be hosting applications 715a, 715b to 715n. Furthermore, the enterprise server 705 may also be in communication with users 725a, 725b to 725n and UAR 720a, 720b to 720n.

In another embodiment, the users (727a, 727b, through 727n) may directly interact with the applications (715a, 715b, through 715n) and associated UARs (720a, 720b, through 720n) without levering the enterprise server 705 and the included context module 710. In this scenario the CDDs and context mechanism will be local to end user machines.

Accordingly, system 700 may be used to implement any one of methods 100-600. Additionally, any number of modifications may be made to system 700. For example, multiple enterprise servers may exist or the users may be in communication directly with application server 715. Further, multiple application servers may also exist. Accordingly, context module 710 may be configured to generate patterns, rules, CDDs, associations, etc., and determine matches between application state information and these, in accordance with embodiments of the present invention and also methods 100-600.

Figure 8:
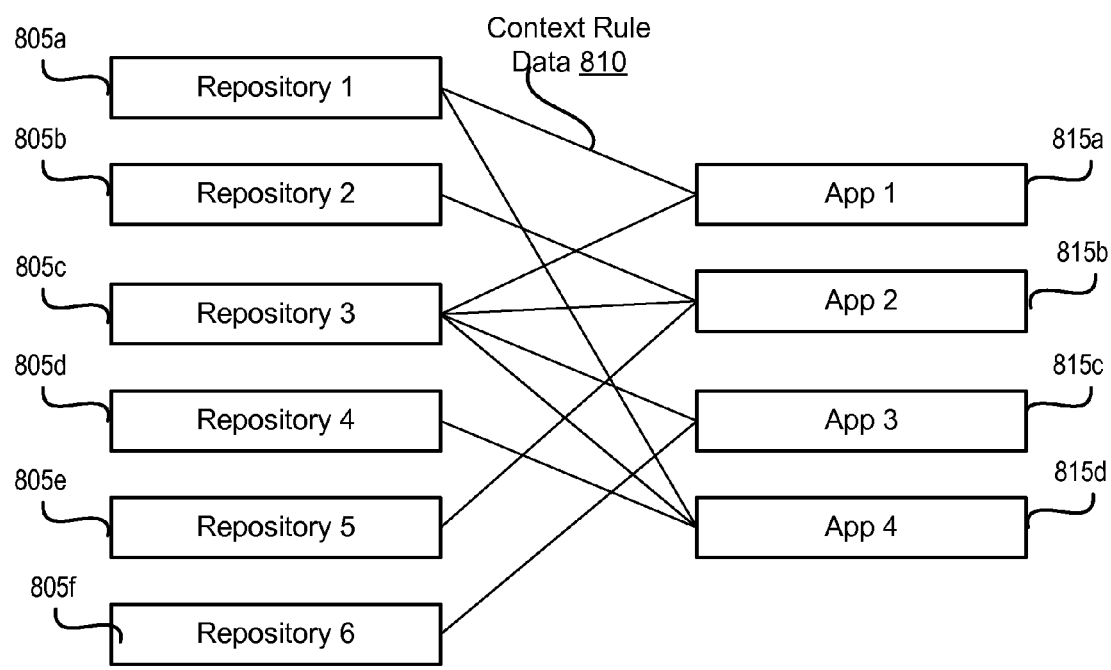
FIG. 8 illustrates a relational diagram, according to embodiments of the present invention.

Referring to FIG. 8, a relational diagram is illustrated, according to embodiments of the present invention. The diagram includes repositories (i.e., UARs) 805a-805f, context rule data 810, and applications 815a-815d. This diagram illustrates one possible relationship designation based on context rule data 810. Context rule data 810 is configured to allow any relationship between any one of repositories 805a-805f and applications 815a-815d. Furthermore, relationships with subsets of the repositories 805a-805f may also be established.

Turning now to FIG. 9, one example of a CDD is provided. In this example, the CDD would indicate that the repository located at "http://www.somewhere.com/sampleuar" is relevant when the user is viewing any webpage with a URI that begins with either "http://www.somesite.com/someapplication/" or "http://www.someforum.com/someappforum/." Nonetheless, other designations and schemas may be used to provide the CDD.

Figure 10:
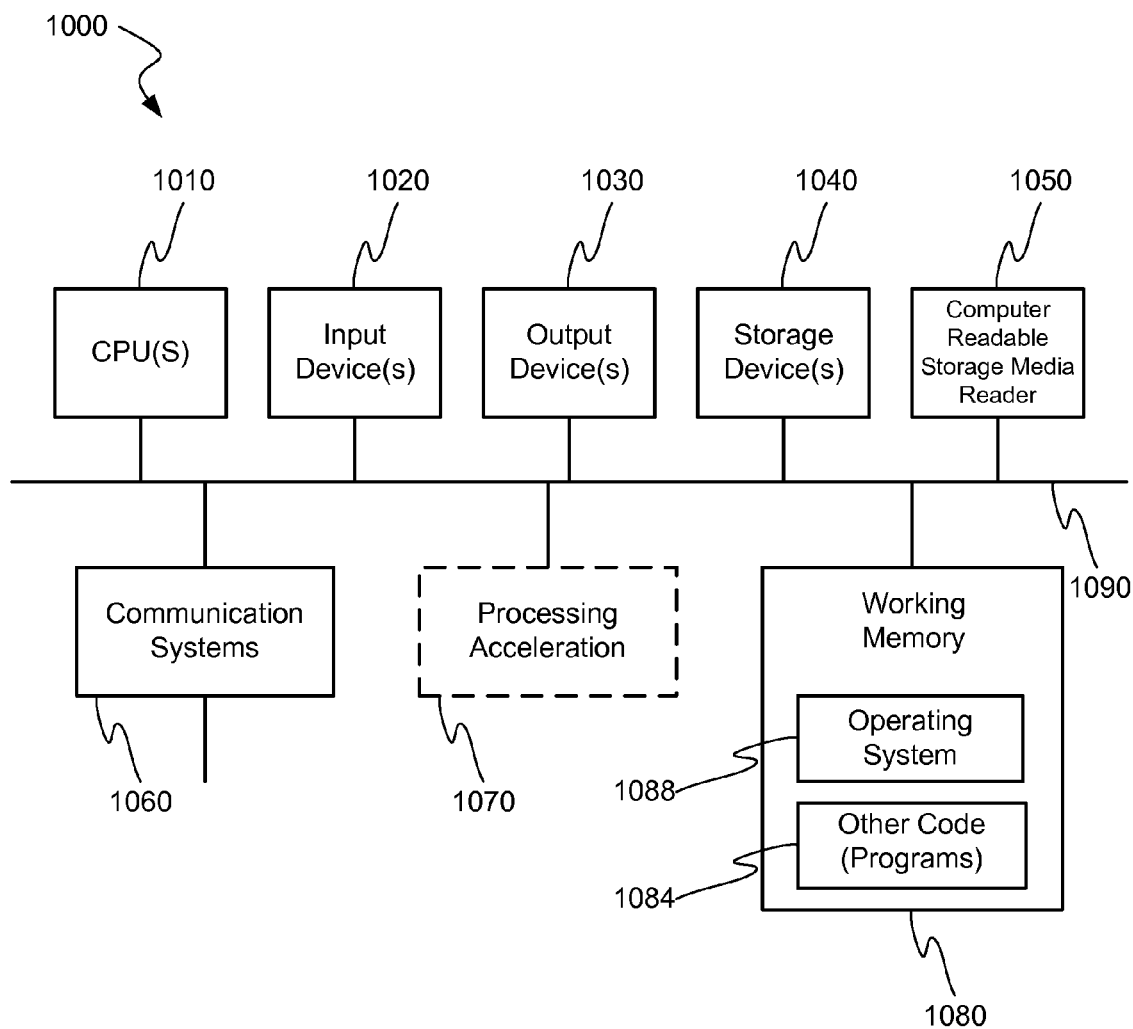
FIG. 10 is a generalized schematic diagram illustrating a computer system, in accordance with various embodiments of the invention.

FIG. 10 is a block diagram illustrating an exemplary computer system 1000 in which embodiments of the present invention may be implemented. The computer system 1000 is shown comprising hardware elements that may be electrically coupled via a bus 1090. The hardware elements may include one or more central processing units 1010, one or more input device(s) 1020 (e.g., a mouse, a keyboard, etc.), and one or more output device(s) 1030 (e.g., a display device, a printer, etc.). The computer system 1000 may also include one or more storage device(s) 1040. By way of example, storage device(s) 1040 may be disk drives, optical storage devices, a solid-state storage device such as a random access memory ("RAM") and/or a read-only memory ("ROM"), which can be programmable, flash-updateable, and/or the like.

The computer system 1000 may additionally include a computer-readable storage media reader 1050, a communication system 1060 (e.g., a modem, a network card (wireless or wired), an infra-red communication device, Bluetooth™ device, cellular communication device, etc.), and working memory 1080, which may include RAM and ROM devices as described above. In some embodiments, the computer system 1000 may also include a processing acceleration unit 1070, which can include a digital signal processor, a special-purpose processor, and/or the like.

The computer-readable storage media reader 1050 can further be connected to a computer-readable storage medium, together (and, optionally, in combination with storage device(s) 1040) comprehensively representing remote, local, fixed, and/or removable storage devices plus storage media for temporarily and/or more permanently containing computer-readable information. The communication system 1060 may permit data to be exchanged with a network, system, computer, and/or other component described above.

The computer system 1000 may also comprise software elements, shown as being currently located within a working memory 1080, including an operating system 1088 and/or other code 1084. It should be appreciated that alternate embodiments of a computer system 1000 may have numerous variations from that described above. For example, customized hardware might also be used and/or particular elements might be implemented in hardware, software (including portable software, such as applets), or both. Furthermore, connection to other computing devices such as network input/output and data acquisition devices may also occur.

Software of computer system 1000 may include code 1084 for implementing any or all of the functions of the various elements of the architecture as described herein. For example, software, stored on and/or executed by a computer system such as system 1000, can provide the functionality and/or other components of the invention such as those discussed above. Methods implementable by software on some of these components have been discussed above in more detail.

Figure 11:
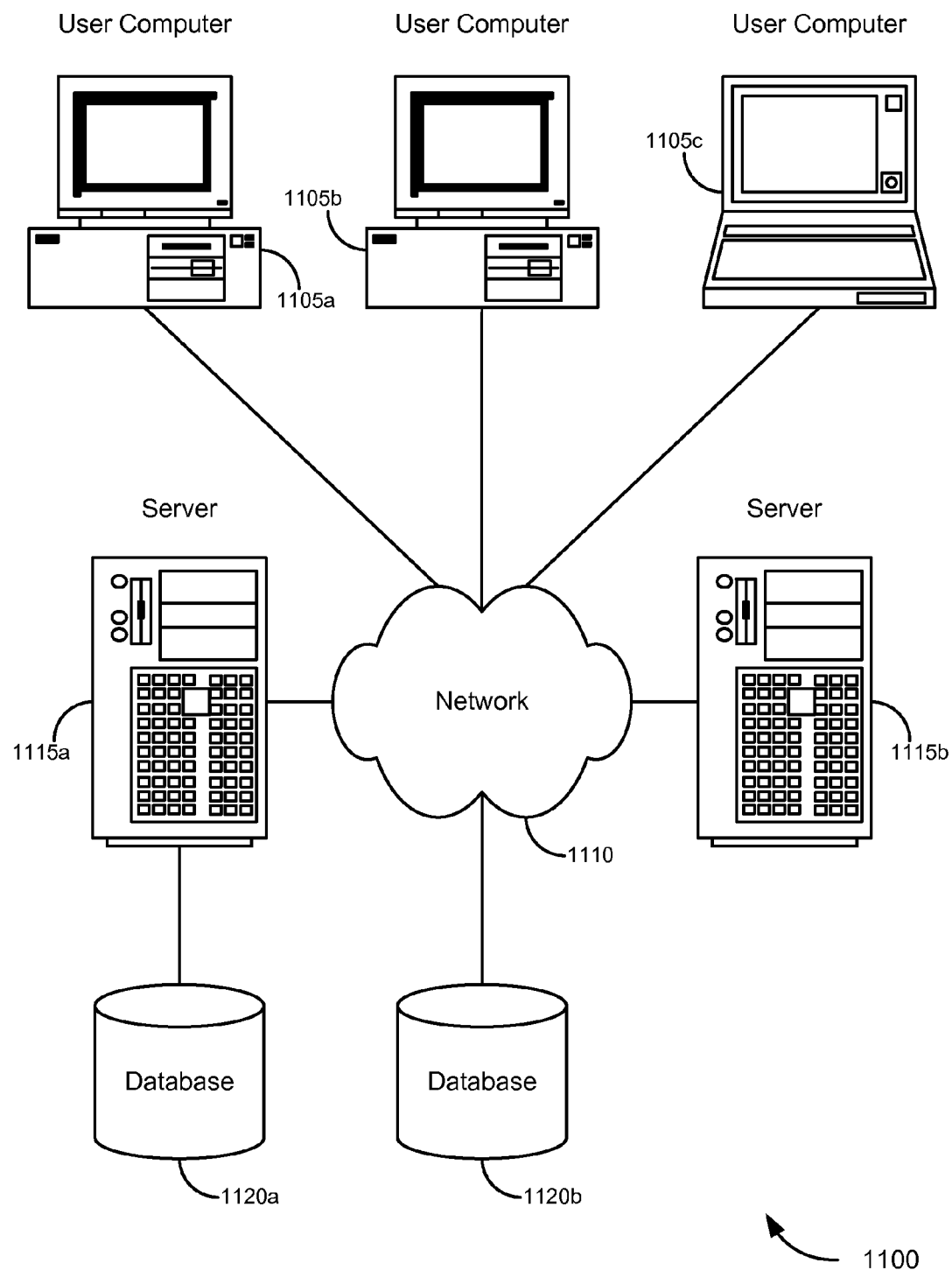
FIG. 11 is a block diagram illustrating a networked system of computers, which can be used in accordance with various embodiments of the invention.

Merely by way of example, FIG. 11 illustrates a schematic diagram of a system 1100 that can be used in accordance with one set of embodiments. The system 1100 can include one or more user computers 1105. The user computers 1105 can be general purpose personal computers (including, merely by way of example, personal computers and/or laptop computers running any appropriate flavor of Microsoft Corp.'s Windows™ and/or Apple Corp.'s Macintosh™ operating systems) and/or workstation computers running any of a variety of commercially available UNIX™ or UNIX-like operating systems. These user computers 1105 can also have any of a variety of applications, including one or more applications configured to perform methods of the invention, as well as one or more office applications, database client and/or server applications, and web browser applications. Alternatively, the user computers 1105 can be any other electronic device, such as a thin-client computer, Internet-enabled mobile telephone, and/or personal digital assistant (PDA), capable of communicating via a network (e.g., the network 1110 described below) and/or displaying and navigating web pages or other types of electronic documents. Although the exemplary system 1100 is shown with three user computers 1105, any number of user computers can be supported.

Certain embodiments of the invention operate in a networked environment, which can include a network 1110. The network 1110 can be any type of network familiar to those skilled in the art that can support data communications using any of a variety of commercially available protocols, including without limitation TCP/IP, SNA, IPX, AppleTalk, and the like. Merely by way of example, the network 1110 can be a local area network ("LAN"), including without limitation an Ethernet network, a Token-Ring network, and/or the like; a wide-area network (WAN); a virtual network, including without limitation a virtual private network ("VPN"); the Internet; an intranet; an extranet; a public switched telephone network ("PSTN"); an infrared network; a wireless network, including without limitation a network operating under any of the IEEE 802.11 suite of protocols, the Bluetooth™ protocol known in the art, and/or any other wireless protocol; and/or any combination of these and/or other networks.

Embodiments of the invention can include one or more server computers 1115. Each of the server computers 1115 may be configured with an operating system, including without limitation any of those discussed above, as well as any commercially (or freely) available server operating systems. Each of the servers 1115 may also be running one or more applications, which can be configured to provide services to one or more user computers 1105 and/or other server computers 1115.

Merely by way of example, one of the server computers 1115 may be a web server, which can be used, merely by way of example, to process requests for web pages or other electronic documents from user computers 1105. The web server can also run a variety of server applications, including HTTP servers, FTP servers, CGI servers, database servers, Java™ servers, and the like. In some embodiments of the invention, the web server may be configured to serve web pages that can be operated within a web browser on one or more of the user computers 1105 to perform methods of the invention.

The server computers 1115, in some embodiments, might include one or more application servers, which can include one or more applications accessible by a client running on one or more of the user computers 1105 and/or other server computers 1115. Merely by way of example, the server computers 1115 can be one or more general purpose computers capable of executing programs or scripts in response to the user computers 1105 and/or other server computers 1115, including without limitation web applications (which might, in some cases, be configured to perform methods of the invention). Merely by way of example, a web application can be implemented as one or more scripts or programs written in any suitable programming language, such as Java™, C, C#™ or C++, and/or any scripting language, such as Perl, Python, or TCL, as well as combinations of any programming/scripting languages. The application server(s) can also include database servers, including without limitation those commercially available from Oracle™, Microsoft™, Sybase™, IBM™ and the like, which can process requests from clients (including, depending on the configuration, database clients, API clients, web browsers, etc.) running on a user computer 1105 and/or another server computer 1115. In some embodiments, an application server can create web pages dynamically for displaying the information in accordance with embodiments of the invention. Data provided by an application server may be formatted as web pages (comprising HTML, Javascript, etc., for example) and/or may be forwarded to a user computer 1105 via a web server (as described above, for example). Similarly, a web server might receive web page requests and/or input data from a user computer 1105 and/or forward the web page requests and/or input data to an application server. In some cases, a web server may be integrated with an application server.

In accordance with further embodiments, one or more server computers 1115 can function as a file server and/or can include one or more of the files (e.g., application code, data files, etc.) necessary to implement methods of the invention incorporated by an application running on a user computer 1105 and/or another server computer 1115. Alternatively, as those skilled in the art will appreciate, a file server can include all necessary files, allowing such an application to be invoked remotely by a user computer 1105 and/or server computer 1115. It should be noted that the functions described with respect to various servers herein (e.g., application server, database server, web server, file server, etc.) can be performed by a single server and/or a plurality of specialized servers, depending on implementation-specific needs and parameters.

In certain embodiments, the system can include one or more database(s) 1120. The location of the database(s) 1120 is discretionary. Merely by way of example, a database 1120a might reside on a storage medium local to (and/or resident in) a server computer 1115a (and/or a user computer 1105). Alternatively, a database 1120b can be remote from any or all of the computers 1105, 1115, so long as the database can be in communication (e.g., via the network 1110) with one or more of these. In a particular set of embodiments, a database 1120 can reside in a storage-area network ("SAN") familiar to those skilled in the art. (Likewise, any necessary files for performing the functions attributed to the computers 1105, 1115 can be stored locally on the respective computer and/or remotely, as appropriate.) In one set of embodiments, the database 1120 can be a relational database, such as an Oracle™ database, that is adapted to store, update, and retrieve data in response to SQL-formatted commands. The database might be controlled and/or maintained by a database server, as described above, for example.

The invention has now been described in detail for the purposes of clarity and understanding. However, it will be appreciated that certain changes and modifications may be practiced within the scope of the appended claims.

What is claimed:

1. A method of deploying user assistance information, the method comprising:
   providing access to a container storing a plurality of context domain declarations (CDDs), each CDD of the plurality of CDDs associated with at least one user assistance repository (UAR);
   creating a new CDD, wherein the new CDD specifies an associated user assistance repository (UAR) and a universal resource identifier (URI), the URI identifying an application or application state for which the associated UAR for the new CDD is applicable;
   deploying the new CDD independently from the application and the associated UAR;
   distributing the new CDD to one or more users;
   identifying current state information for a first application being executed for a user of the one or more users, the current state information including a universal resource identifier (URI) associated with the first application;
   for each CDD of the plurality of CDDs, comparing the URI associated with the first application with the URI associated with the CDD;
   based on the comparing, determining that the URI associated with a first CDD of the plurality of CDDs matches the URI associated with the first application;
   retrieving the associated UAR for the first CDD; and
   providing the UAR to the user.

2. The method of deploying user assistance information as in claim 1, further comprising:
   retrieving universal resource information for the UAR; and
   using the universal resource information to access content from the UAR.

3. The method of deploying user assistance information as in claim 2, wherein the distributing of the new CDD to the one or more users further comprises notifying the one or more users via one or more communications protocols.

4. The method of deploying user assistance information as in claim 3, wherein the one or more communications protocols include one or more of the following: email, resource description framework (RDF) site summary (RSS), short message service (SMS), micro-blogging, or blogging.

5. The method of deploying user assistance information as in claim 4, further comprising automatically populating one or more of the communications protocols for the one or more users based at least in part on a business or application group associated with the one or more users.

6. The method of deploying user assistance information as in claim 2, further comprising:
   determining that the UAR associated with the new CDD is to be accessed by at least one user;
   caching content from the new CDD; and
   merging entries from the new CDD with previously existing entries.

7. The method of deploying user assistance information as in claim 2, further comprising:
   determining that the UAR associated with the new CDD is not to be accessed by at least one user;

determining that the new CDD includes a push deployment designation; and in response to the determination that the new CDD includes the push deployment designation, caching content from the new CDD.

8. The method of deploying user assistance information as in claim 1, wherein information for the new CDD comprises structured data configured to be processed by machines: extensible markup language (XML) or JavaScript Object Notation (JSON).

9. The method of deploying user assistance information as in claim 1, wherein the associated UAR is controlled by a third party, and wherein at least one of the third party, the one or more users, and an application's host server are independently controlled and authenticated.

10. The method of deploying user assistance information as in claim 1, wherein adding of the new content into a UAR is initiated in part by interacting with a submit new content interface mechanism.

11. The method of deploying user assistance information as in claim 1, wherein accessing the associated UAR includes pre-populating security credential information.

12. A method of providing universal access to user assistance repositories (UARs), the method comprising:
   identifying current state information for a first application being executed for at least one user, wherein the current state information includes a universal resource identifier (URI) associated with the first application;
   accessing one or more context domain declarations (CDDs) from an original repository or from a cached storage location, wherein each CDD of the one or more CDDs is associated with a user assistance repository (UAR) and a universal resource identifier (URI), the URI identifying an application or application state for which the associated UAR for the CDD is applicable;
   for each CDD of the one or more CDDs, comparing the URI associated with the first application with the URI associated with the CDD;
   based on the comparing, determining that the URI associated with a first CDD of the one or more CDDs matches the URI associated with the first application;
   retrieving the associated UAR for the first CDD; and
   providing the UAR to the user.

13. The method of providing universal access to UARs as in claim 12, further comprising:
   determining that no UAR includes applicable information for the current state information; and
   in response, providing an interface configured to add one or more new documents to one or more UARs where the UAR association is determined based on the one or more CDDs and the application state.

14. The method of providing universal access to UARs as in claim 12, further comprising searching for the associated UAR and returning universal resource information for the associated UAR.

15. The method of providing universal access to UARs as in claim 14, wherein the associated UAR includes content specific to the current state of the application.

16. The method of providing universal access to UARs as in claim 12, further comprising:
   populating a set of attributes for the UAR; and
   providing the at least one user with a subscription interface for the UAR based on the set of attributes.

17. The method of providing universal access to UARs as in claim 16, further comprising:
   generating a set of rules for each UAR indicating each UAR's relevancy to one or more contexts; and
   updating the set of rules in response to receiving changes to the relevancy of at least one of the UARs.

18. One or more non-transitory computer-readable media storing computer-executable instructions executable by one or more processors, the computer-executable instructions comprising:
   instructions that cause the one or more processors to identify current state information for a first application being executed for at least one user, wherein the current state information includes a universal resource identifier (URI) associated with the first application;
   instructions that cause the one or more processors to access one or more context domain declarations (CDDs) from an original repository or from a cached storage location, wherein each CDD of the one or more CDDs is associated with a user assistance repository (UAR) and a universal resource identifier (URI), the URI identifying an application or application state for which the associated UAR for the CDD is applicable;
   for each CDD of the one or more CDDs, instructions that cause the one or more processors to compare the URI associated with the first application with the URI associated with the CDD;
   based on the comparing, instructions that cause the one or more processors to determine that the URI associated with a first CDD of the one or more CDDs matches the URI associated with the first application;
   instructions that cause the one or more processors to retrieve the associated UAR for the first CDD; and
   instructions that cause the one or more processors to provide the UAR to the user.

* * * * *